(12) United States Patent
Levy et al.

(10) Patent No.: US 12,189,578 B2
(45) Date of Patent: Jan. 7, 2025

(54) METADATA FOR QUERING FILE SYSTEM PATHNAMES

(71) Applicant: VAST DATA LTD., Tel Aviv (IL)

(72) Inventors: Asaf Levy, Tel Aviv (IL); Eyal Gordon, Tel Aviv (IL); Vlad Zdornov, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 8 days.

(21) Appl. No.: 17/810,342

(22) Filed: Jun. 30, 2022

(65) Prior Publication Data

US 2024/0004835 A1 Jan. 4, 2024

(51) Int. Cl.
*G06F 16/00* (2019.01)
*G06F 16/14* (2019.01)
*G06F 16/185* (2019.01)
*G06F 16/22* (2019.01)

(52) U.S. Cl.
CPC .......... *G06F 16/144* (2019.01); *G06F 16/156* (2019.01); *G06F 16/185* (2019.01); *G06F 16/2282* (2019.01)

(58) Field of Classification Search
CPC .................................................... G06F 16/185
See application file for complete search history.

(56) References Cited

U.S. PATENT DOCUMENTS

2016/0371297 A1* 12/2016 Okun .................... G06F 16/185
2017/0024152 A1* 1/2017 Bhagi ................. G06F 11/3034

* cited by examiner

*Primary Examiner* — Ajith Jacob
(74) *Attorney, Agent, or Firm* — Reches Patents

(57) ABSTRACT

A method for obtaining information related to a filesystem path in a file system that is stored in a storage system, the method may include (i) receiving a request to obtain hierarchy information related to file system entities stored under the filesystem path; and (ii) retrieving the hierarchy information; wherein the retrieving comprises accessing a filesystem hierarchy table that stores information regarding pathnames of file system entities of the file system; wherein the retrieving includes searching for path components of the filesystem path in subsets of cells of the filesystem hierarchy table, wherein each subset of cells is part of a set of cells that include path components of a certain pathname of a filesystem entity that belong to the file system.

17 Claims, 6 Drawing Sheets

| Old path 602(1) = 'a/b' | New path 603(1) = '/x/y/b' |
|---|---|
| Old path 602(2) = 'a/b/c' | New path 603(2) = 'x/y/z/b/c' |
| Old path 602(3) | New path 603(3) |

METADATA FOR QUERING FILE SYSTEM PATHNAMES

TECHNICAL FIELD

The present disclosure generally relates to the field of data storage, and more particularly to metadata indicative of file system pathnames within a storage system.

BACKGROUND

File systems are getting bigger and bigger and may include more than billions of files, billions of directories, and deep hierarchies.

Data center's administrators may need to extract details of files from certain branches of the filesystem hierarchy or the entire tree, that fulfill certain characteristics. The file extraction may be needed by backup applications or other monitoring applications that are external to the storage system.

Due to the vast number of files and directories and the hierarchy complication that requires recursive traversal of hierarchies, extracting the required files may consume time and compute resources, and in some cases may take hours and even days to complete the query.

Furthermore, standard filesystem protocols (e.g., NFS, SMB) may not support the specific commands for obtaining the required data for feeding the external applications. Proprietary management commands may also lack the specific filters requested for the specific needs of the clients. Even if there are proprietary filters that suit the requirements, the filesystem hierarchies compose a complicated structure to be scanned efficiently.

SUMMARY

There may be provide a storage system, a method and a non-transitory computer readable medium for metadata indicative of file systems within a storage system.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 6 is an example of an alias table.

DETAILED DESCRIPTION

Figure 1:
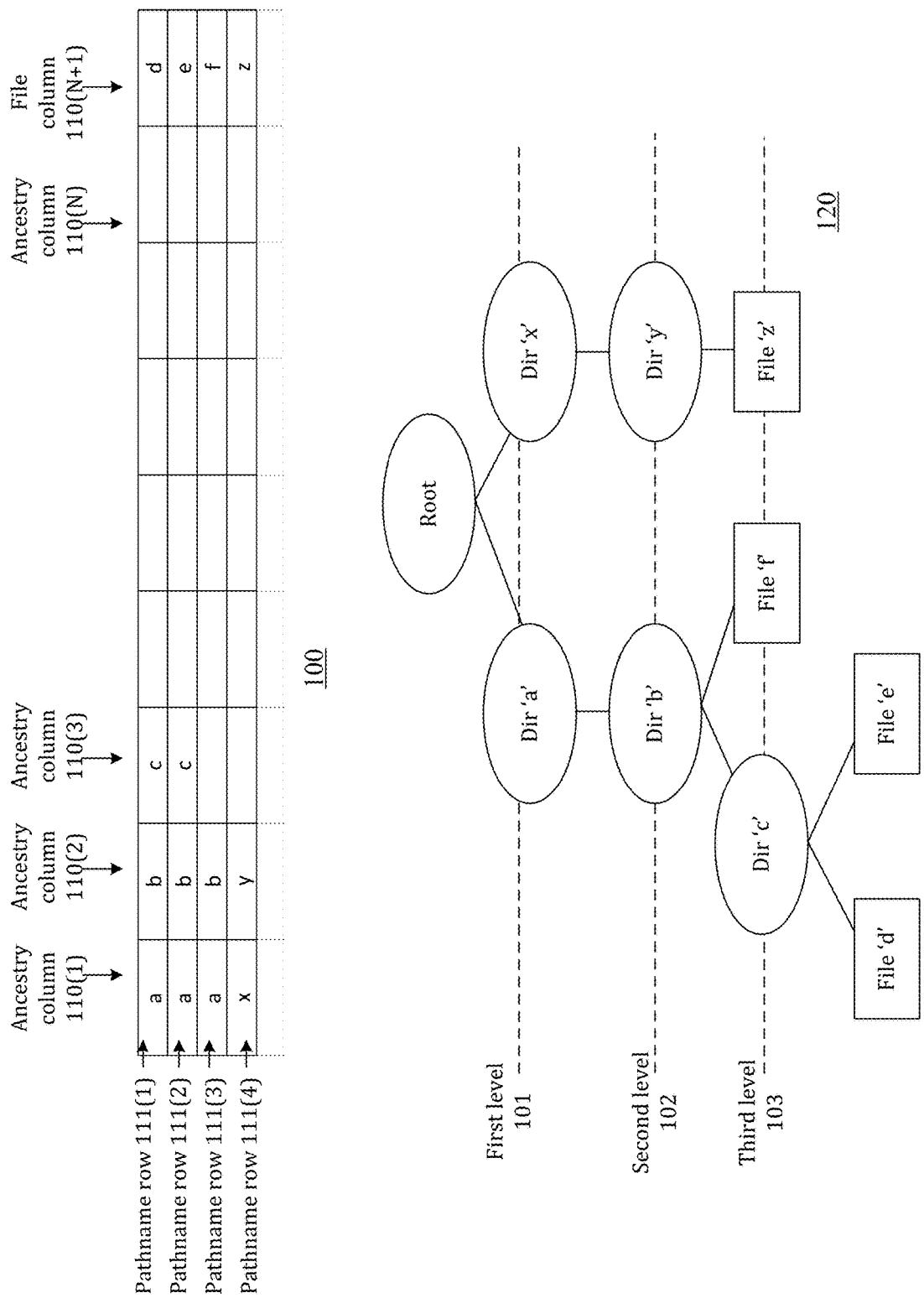
FIG. 1 is an example of a pathname table and a corresponding filesystem tree.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a compute core. The compute core can be a processing circuitry, a part of processing circuitry, a virtual machine core, and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the application may be provided.

There are provided systems, methods, and non-transitory computer readable medium for metadata indicative of file systems within a storage system.

A file system tree is represented as a filesystem hierarchy table that describes the hierarchies of the filesystem in a tabular manner, for allowing querying hierarchies of the filesystem in an efficient manner. Accessing the table further provides flexibility to a user of the storage system in composing customized filesystem queries, by using standard SQL commands directed to the filesystem hierarchy table, in a similar manner to accessing a DB (database) table. The metadata of the filesystem entities (files, directories), and particularly—the names, are represented in the table that can be accessed via SQL commands by external applications.

Each column of the table represents names included in a certain hierarchy of the file system, and each row represents the pathname of a certain file, that is divided into pathname components that are stored under different columns.

Each filesystem element (or at least—each file) in the filesystem is assigned, upon creation with a row that contains its pathname information and may further contain other attributes and metadata of the file. The pathname (chained names along the path from the root to the file) is split into pathname components, wherein each component (other than the last component) is related to one ancestor directory (i.e., one hierarchy level) in the pathname of the filesystem entity. The last component extracted from the pathname represents the name of the filesystem entity itself.

A pathname component may refer to one directory in the path, whose name is enclosed by forward slashes in the pathname.

Each pathname component (directory name or other directory identifier) is stored in a cell (intersection of the row and a column) in the row of the corresponding filesystem entity, and under a column that matches the level of the corresponding directory in the filesystem hierarchy, or in other words—under the column that matches the component order among components of the pathname. The order of the column may be the same order of the component in the pathname.

FIG. 1 illustrates a filesystem hierarchy table 100 that corresponds to a filesystem tree 120 and represents four files having the following pathnames: "/a/b/c/d", "/a/b/c/e", "/a/b/f", "/x/y/z".

Each column represents the names of filesystem ancestors stored in a certain tree hierarchy. The term ancestor refers to any directory in the path of a file. For example, ancestry column 110(1) represents names of ancestor directories included in a first level 101 of the tree, e.g., directories 'a' and 'x'. Ancestry column 110(2) represents names of ancestor directories included in a second level 102 of the tree, e.g., directories 'b' and 'y'. Ancestry column 110(3) represents names of ancestor directories included in a third level 103 of the tree, e.g., directory 'c'. An ancestor name may appear more than once when it belongs to an ancestor directory of more than one file.

Each row represents the pathname of one file, where the cells at different column locations represent the names of ancestor directories of the file, according to their order in the hierarchy. The first pathname row 111(1) represents the pathname "/a/b/c/d", where the first cell, in the first column location, i.e., under the column called ancestry column 110(1), contains the name in the first level under the root directory, which is "a". The second cell, in the second column location, i.e., under the column called ancestry column 110(2), contains the name of the next (second) ancestor directory in the hierarchy, i.e., "b". The third cell, in the third column location, under the column called ancestry column 110(3), contains the name of the third ancestor directory in the hierarchy, i.e., "c".

Figure 2:
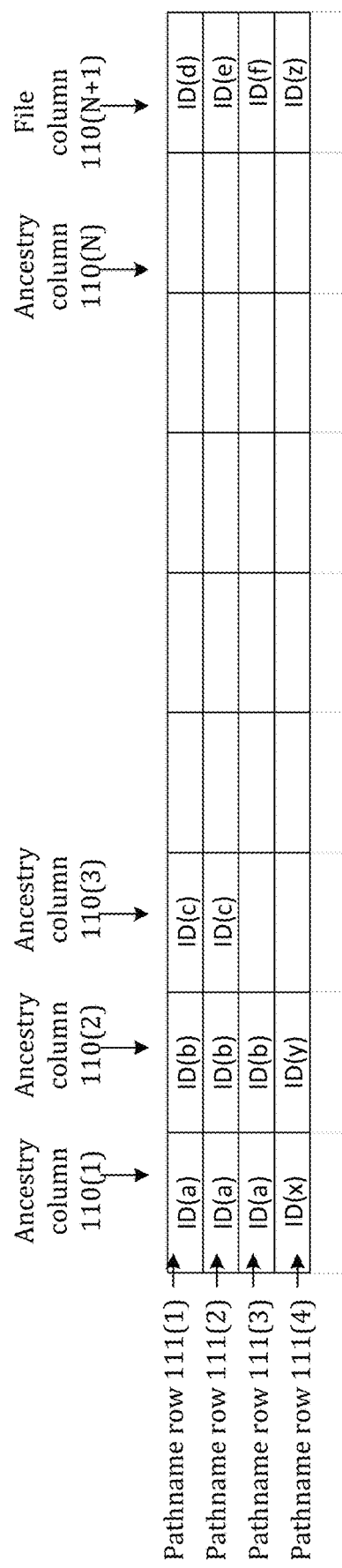
FIG. 2 is an example of a pathname table

There may be a maximum of N number of columns that represent up to N ancestor directories of the files. Table 100 illustrates path-component identifiers as the names (strings) of the component, while table 200 of FIG. 2 illustrates the path-component identifiers as identifiers representing the names, other than the names themselves. The path-component identifiers may be, for example, inodes (index nodes, which is a data structure in a Unix-style file system that describes file-system elements) indices. When using path-component identifiers (such as inodes) that are not the names, each filesystem entity, whether a directory or a file, has a unique identifier in the system. This is unlike a name, which is not unique, as multiple directories can include the same directory or file name, and only a full pathname is unique.

Another column, e.g., the (N+1)th column, called file column 110(N+1), includes the file-name identifier, which may be the name itself or another identifier that is indicative of the name.

Tables 100 and 200 may include further columns for file attributes other than the name, for example, timestamps, access rights, pointer to the file content references, and any other metadata of the file.

When an accessing entity (a user of the storage system or an external application that ac-cesses the storage system) needs to obtain information about all the filesystem entities under a certain subtree, wherein the certain subtree is identified by a directory pathname, e.g., 7a/b', the accessing entity may send an SQL command (or other query), addressed to the filesystem hierarchy table, that identifies the path, for example: the SQL command may include the condition: where ancestry-col-1='a' AND ancestry-col-2='b'. The SQL command may include a compo-site condition that further includes conditions on other attributes, for example, retrieving only files that were changed since a certain time.

If the table includes real names, then the table will be searched for rows that fulfil the condition of having a value 'a' in the first column and having a value 'b' in the second column. The result of the query will be the content of the cells that intersect with the found rows and the columns that follow the columns indicated in the query (or in other words—the columns that belong to levels below the level of the lowest level indicated in the query). In this example, the response will create the following file list: 'c/d','c/e', 'f'. Each file name in the list may or may not be pre-ceded by the directories mentioned in the SQL request, i.e., '/a/b/'.

If the table includes unique identifiers that are not names, the condition of the received SQL command will be translated to the concatenated, full pathname of the directory, e.g., /a/b/. The full pathname or the directory will be looked up in a name-to-identifier mapping table (e.g., inode table) for obtaining the unique identifier of the directory, and the corresponding column will be searched for the unique identifier. The corresponding column is selected according to the number of components in the pathname (or the requested level). In this example, there are two components (a, b), and therefore the second column (that corresponds to the second level) is searched for the identifier of directory/a/b/. The response will include the same file list as in the above example.

When a user wishes to retrieve the entire filesystem tree, starting from the root, the SQL query may include the sign '/' that indicates the root, and a simple scan is performed on the table for retrieving all the rows in the table.

When a filesystem element is moved from its original path to a new path, its ancestry columns should be changed, as well as the ancestry column of its descendants. For example, if directory b is moved to directory x (or renamed from/a/b to/x/b) then—column 'ancestry column 100(2)' should be searched for filesystem entities 'b', and for each found row (either the row of the moved filesystem entity (/a/b) or any of its descendants (/a/b/*), the previous column(s) should be change from 'a' to 'x'. If the nesting of the new path has a different number of ancestors than in the old path, a shifting of the values in columns corresponding to lower levels (non-changed levels) should be shifted to the right (if the new path has more ancestors) or to the left (if the new path has fewer ancestors).

In order to reduce the latency imposed by the extra work needed to response to rename requests, an alias table may be maintained to include mapping between the old and new paths. For example, if directory 'b' is moved from '/a' to '/x/y', an entry will be added to the alias table for mapping 'a/b' to '/x/y/b'.

The alias table should be looked up for relevant mappings upon queries. Based on the mapping, queries asking for files under 'a', will be modified so as to add a condition to eliminate rows related to/a/b', for example, the condition "Ancestry Col 1"="a" will be reconstructed to: "Ancestry Col 1"="a" AND "Ancestry Col 2" !="b". Queries looking for files under "x" or under "x/y" would add a predicate OR "Ancestry Col 2" 'b'.

FIG. 6 illustrates an example of an alias data-structure, such as alias table 600 for storing paths of directories that have been renamed or moved to another subtree and have not yet updated in the filesystem hierarchy table. Table 600 includes entries for old paths 602(1)-602(3) that are associated with new paths 603(1)-603(3).

When directory 'b' that resides under 'a', having the path (old path) '/a/b' is renamed or moved under directory '/x/y', i.e., obtaining a new path '/x/y/b', an entry is assigned in table 600 for facilitating a mapping from the old path to the new path, when receiving queries that refer to directory 'b' under the new path, while 'b' is still recorded under the old path in the filesystem hierarchy table. For example, entry 602(1) includes the old path 'a/b' that is associated with the new path 'x/y/b' in entry 603(1). In the same manner, any directory that descends from directory 'b' may be also registered in table 600. For example, directory 'c' descends from directory 'b', and an entry 602(2) is assigned with the old path 'a/b/c', that is associated with the new path 'x/y/b/c' in entry 603(2).

Figure 3:
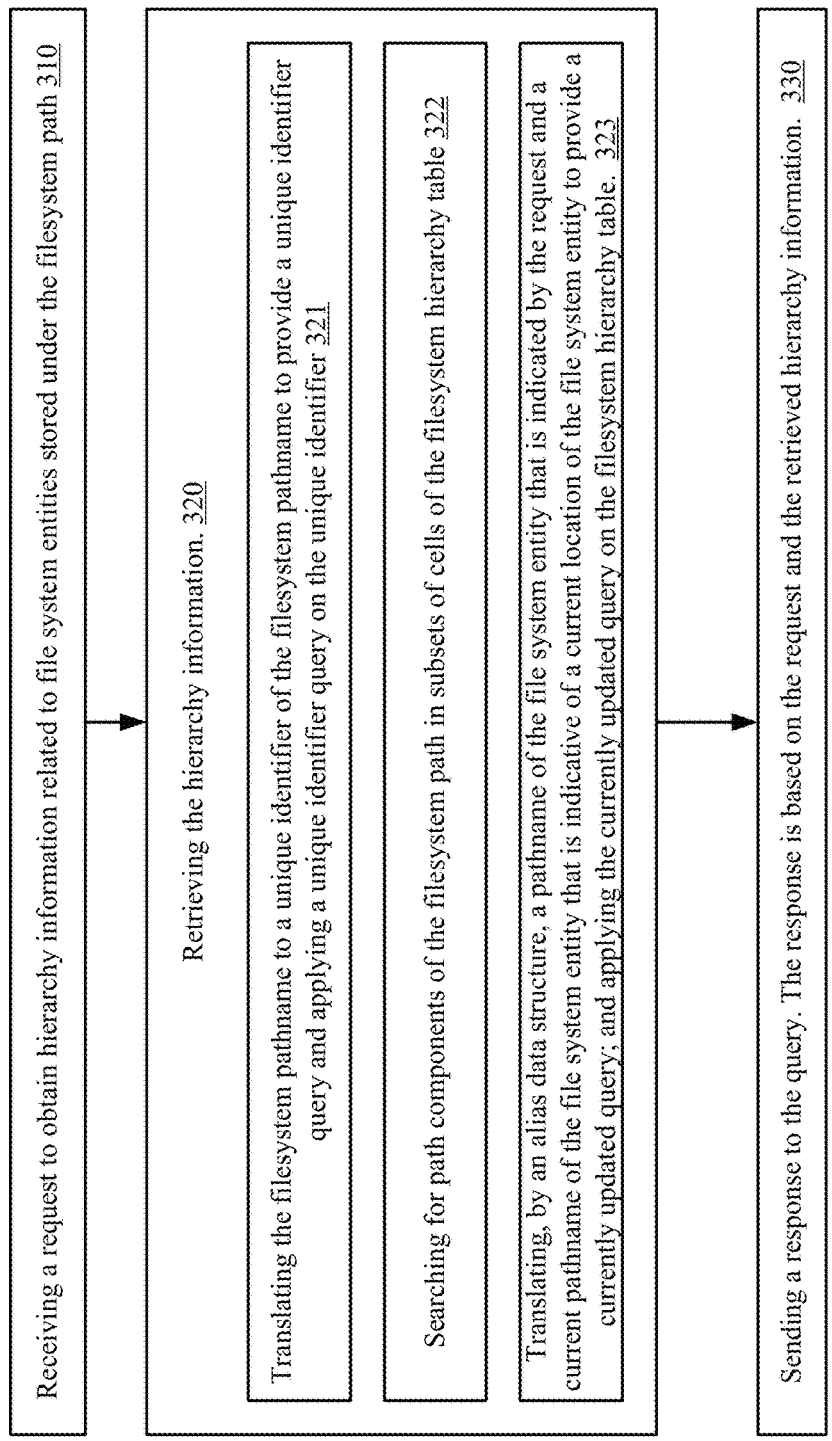
FIG. 3 is an example of a method.

FIG. 3 illustrates method 300 for obtaining information related to a filesystem path in a file system that is stored in a storage system.

Method 300 may start by step 310 of receiving a request to obtain hierarchy information related to file system entities stored under the filesystem path. The hierarchy information may include pathnames of at least part of the file system entities stored under the filesystem path, and may include other attributes of the at least part of the file system entities.

Step 310 may be followed by step 320 of retrieving the hierarchy information. Step 320 may include accessing a filesystem hierarchy table that stores information regarding pathnames of file system entities of the file system. The file system entities of the file system include the file system entities stored under the filesystem path and other file system entities stored under different filesystem paths.

Step 320 may include step 322 of searching for path components of the filesystem path in subsets of cells of the filesystem hierarchy table. Each subset of cells is part of a set of cells that include path components of a pathname of a filesystem entity. A subset of cells may be part of a row that includes the components of the filesystem path being looked up for. A set of cells may include the cells of a row that include all components that correspond to a full path of a filesystem entity whose metadata is stored in the row.

The path components in the subset of cells may include unique identifiers of the path components in the subset of cells. Path components having the same name but of different paths have different unique identifiers.

When using unique identifiers—step 320 may include step 321 of translating the filesystem pathname to a unique identifier of the filesystem pathname to provide a unique identifier query and applying a unique identifier query on at least part of the unique identifiers. Only unique identifiers that corresponds to the same hierarchy level of the filesystem pathname may be searched. For example, only a column that corresponds to the same hierarchy level of the filesystem pathname may be searched, e.g., column 2 is searched when the filesystem pathname corresponds to the second hierarchy level.

Different rows of the filesystem hierarchy table may be allocated to different files of the filesystem. Each cell of a set of cells, in a row allocated to a file, may include one path component of multiple path components that compose a pathname of the file. An order of the one path component among path components in the pathname of the file may correspond to an order of the cell within the set of cells. This order further corresponds to the order in the hierarchy level of the filesystem.

Different columns of a group of columns of the filesystem hierarchy table may be allocated to different file system levels, one level per column.

The filesystem hierarchy table may also store additional metadata regarding one or more properties other than path, of file system entities of the file system. In this case—method 300 may include applying the searching on the additional metadata when the request includes a condition related to any of the one or more properties.

The path components in the subset of cells may include names of the path components. Step 320 of searching may be applied on the names of the path components in the subset of cells.

The request may be a structural query language (SQL) query—or may differ from an SQL query.

Figure 4:
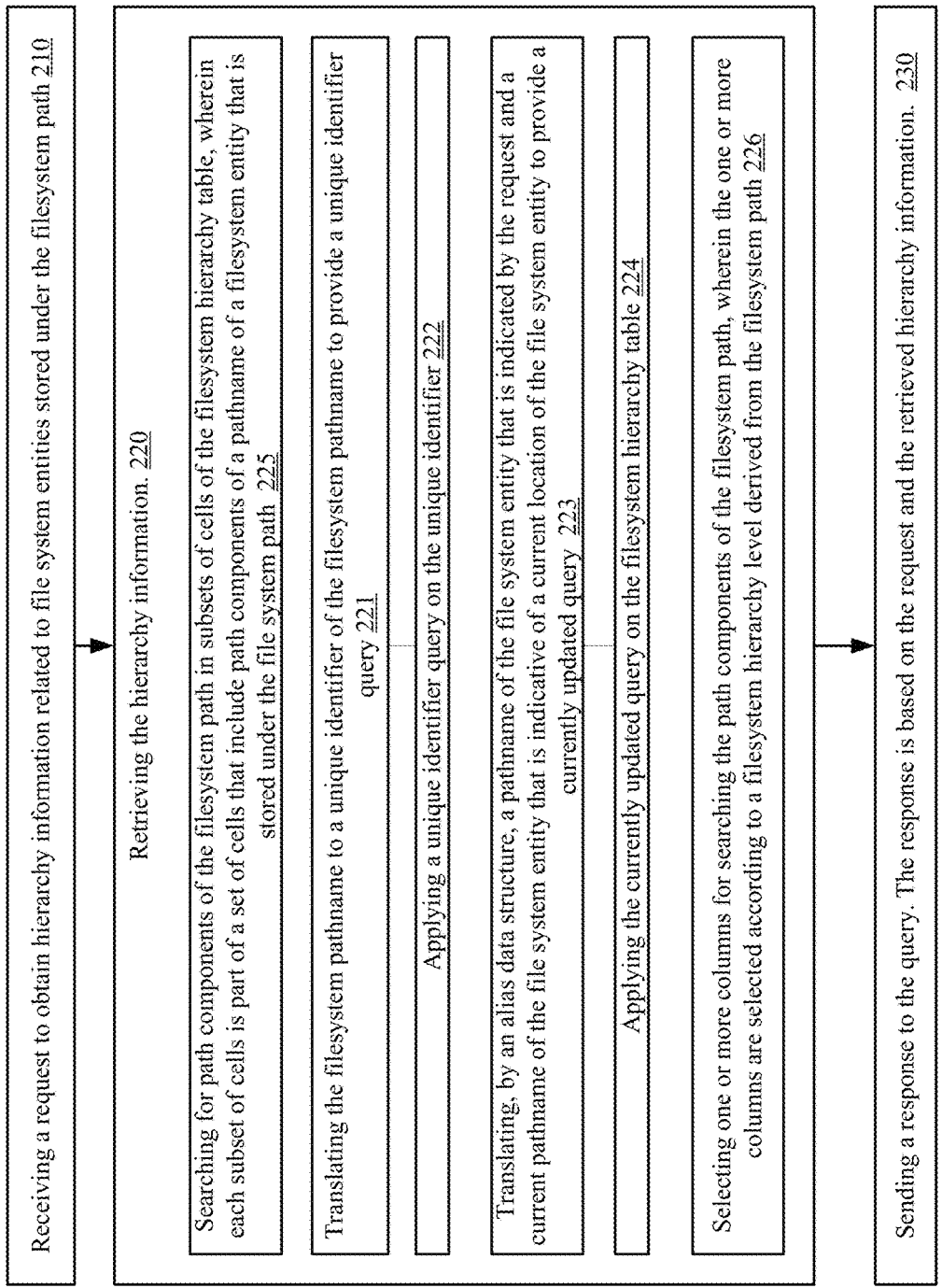
FIG. 4 is an example of a method.

Step 320 may include step 323 of translating, by an alias data structure, the filesystem pathname to provide a translated filesystem pathname. The translating is performed when there were changes in the pathname due to rename or move operations of directories that involves the filesystem pathname, and the filesystem hierarchy table is not yet updated with the changes. Step 323 further includes updating the query based on the filesystem pathname, and applying the updated query on the filesystem hierarchy table. FIG. 4 illustrates an example of method 200 for obtaining information related to a filesystem path in a file system that is stored in a storage system.

Method 200 may include step 210 of receiving a request to obtain hierarchy information related to file system entities stored under the filesystem path.

Step 210 may be followed by step 220 of retrieving the hierarchy information; wherein the retrieving comprises accessing a filesystem hierarchy table that stores information regarding pathnames of file system entities of the file system.

Step 220 may include step 225 of searching for path components of the filesystem path in subsets of cells of the filesystem hierarchy table, wherein each subset of cells is part of a set of cells that include path components of a pathname of a certain filesystem entity that is stored in the filesystem.

The request may be a structural query language (SQL) query.

The path components in the subset of cells may include names of the path components, and wherein the searching is applied on the names of the path components in the subset of cells.

The components in the subset of cells may include unique identifiers of the path components in the subset of cells.

When using unique identifiers then step 220 may include step 221 of translating the filesystem pathname to a unique identifier of the filesystem pathname to provide a unique identifier query, and step 222 of applying a unique identifier query for searching the unique identifier among at least part of the unique identifiers.

The different rows of the filesystem hierarchy table are allocated to different files of the filesystem.

Different columns of a group of columns of the filesystem hierarchy table are allocated to different file system levels, one level per column.

The filesystem hierarchy table may also store additional metadata regarding one or more properties other than path, of file system entities of the file system.

When additional metadata is stored then step 220 may include applying the searching on the additional metadata when the request comprises a condition related to any of the one or more properties. The additional metadata may conform to one or more conditions of the query. Step 220 may include step 223 of translating, by an alias data structure, the filesystem pathname to provide a translated filesystem pathname. The translating is performed when there were changes in the pathname due to rename or move operations of directories that involves the filesystem pathname, and the filesystem hierarchy table is not yet updated with the changes. Step 323 further includes updating the query based on the filesystem pathname, and applying the updated query on the filesystem hierarchy table.

Step 220 may include step 226 of selecting one or more columns for searching the path components of the filesystem path, wherein the one or more columns are selected according to a filesystem hierarchy level derived from the filesystem path, which may be determined based on the number of components in the filesystem path, the distance from the root, etc.

The order of the one or more columns, among columns in a group of columns of the filesystem hierarchy table, corresponds to an order of the filesystem hierarchy level derived from the filesystem path.

Each cell of a set of cells, in a row allocated to a file, includes one path component of multiple path components of a pathname of the file. An order of the one path component among path components in the pathname of the file may correspond to an order of the cell within the set of cells.

Step 220 may be followed by step 230 of sending a response to the query. The response is based on the request and the retrieved hierarchy information.

Figure 5:
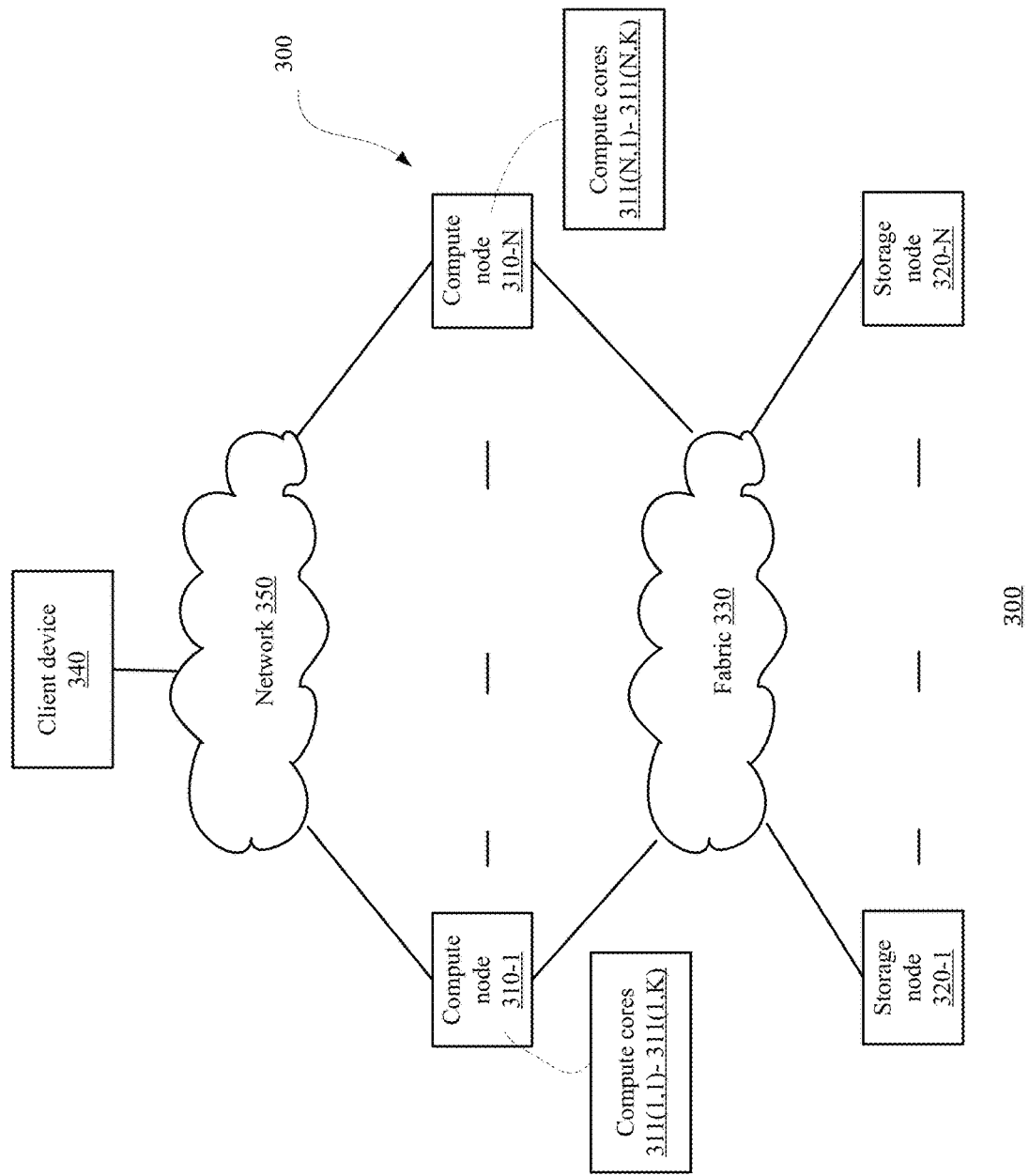
FIG. 5 is an example of a storage system.

FIG. 5 shows an example diagram of a storage system 300 according to the disclosed embodiments.

The storage system 300 includes a number of N compute nodes 310-1 through 310-N (hereinafter referred to individually as a compute node 310 and collectively as compute nodes 310, merely for simplicity purposes, N is an integer equal to or greater than 1). The compute nodes include (or may execute) multiple compute cores each (for example 311(1,1)-311(1,K) of compute node 310-1 and 311(N,1)-311(N,K) of compute node 310-N).

The storage system 300 also includes a number of M storage nodes 320-1 through 320-M (hereinafter referred to individually as a storage node 320 and collectively as storage nodes 320, merely for simplicity purposes, M is an integer equal to or greater than 1). The computer nodes 310 and the storage nodes 320 are connected through a communication fabric 330. M may equal N or may differ from N.

The filesystem hierarchy table may be stored in the storage nodes or in the compute nodes.

In an embodiment, a compute node 310 may be realized as a physical machine or a virtual machine. A physical machine may include a computer, a sever, and the like. A virtual machine may include any virtualized computing instance (executed over a computing hardware), such as a virtual machine, a software container, and the like.

It should be noted that in both configurations (physical or virtual), the compute node 310 does not require any dedicated hardware.

A compute node 310 is configured to perform tasks related the execution of method 200 and/or method 300. In an embodiment, each compute node 310 may interface one or more client devices (such as client device 340). The compute nodes may receive from the client devices (requesting entities) requests such as requests to retrieve hierarchy information according to various conditions. The compute nodes interface the clients via one or more networks, such as network 350. The network may be, but is not limited to, the Internet, the world-wide-web (WWW), a local area network (LAN), a wide area network (WAN), and the like. The response to the query may be sent via the interface.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices inter-connected with each other in a suitable manner.

However, other modifications, variations and alternatives are also possible. The specifica-tions and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms de-scribe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A method for obtaining information related to a filesystem path in a file system that is stored in a storage system, the method comprising:
   receiving a request to obtain hierarchy information related to file system entities stored under the filesystem path, wherein the request is indicative of the filesystem path;
   splitting the filesystem path into path components of the filesystem path, wherein each path component is associated with an ancestor directory of the file system entities stored under the filesystem path;
   retrieving the hierarchy information; wherein the retrieving comprises accessing a filesystem hierarchy table that stores information regarding pathnames of file system entities of the file system; wherein the retrieving includes searching for the path components of the filesystem path in subsets of cells of the filesystem hierarchy table to provide rellevant subsets of cells, wherein each subset of cells is part of a set of cells that include path components of a certain pathname of a filesystem entity that belong to the file system, wherein each cell of each of the rellevant subsets of cells is indicative of a path component of the certain pathname, and wherein the cells of each of the rellevant subsets of cells are indicative of all the path components of the filesystem path; and
   responding to the request with information obtained from sets of cells that include the rellevant subsets of cells.

2. The method according to claim 1 wherein the request is a structural query language (SQL) query.

3. The method according to claim 1 wherein the path components in the subset of cells comprises names of the path components, and wherein the searching is applied on the names of the path components in the subset of cells.

4. The method according to claim 1 wherein the path components in the subset of cells comprises unique identifiers of the path components in the subset of cells.

5. The method according to claim 4 comprising:
   translating the filesystem pathname to a unique identifier of the filesystem pathname to provide a unique identifier query; and
   applying a unique identifier query using the unique identifier.

6. The method according to claim 1 wherein different rows of the filesystem hierarchy table are allocated to different files of the filesystem.

7. The method of claim 6, wherein each cell of a set of cells, in a row allocated to a file, includes one path component of multiple path components of a pathname of the file.

8. The method of claim 7, wherein an order of the one path component among path components in the pathname of the file corresponds to an order of the cell within the set of cells.

9. The method according to claim 1 wherein different columns of a group of columns of the filesystem hierarchy table are allocated to different file system levels, one level per column.

10. The method according to claim 1 wherein the filesystem hierarchy table also stored additional metadata regarding one or more properties other than path, of file system entities of the file system.

11. The method according to claim 10 comprising applying the searching on the additional metadata when the request comprises a condition related to any of the one or more properties.

12. The method according to claim 1 comprising:
    translating, by an alias data structure, the filesystem path to provide a translated filesystem path;
    updating the query based on the translated filesystem path to provide an updated query; and
    applying the updated query on the filesystem hierarchy table.

13. The method of claim 1, wherein the searching comprises selecting one or more columns for searching the path components of the filesystem path, wherein the one or more columns are selected according to a filesystem hierarchy level derived from the filesystem path.

14. The method of claim 13, wherein an order of the one or more columns, among columns in a group of columns of the filesystem hierarchy table, corresponds to an order of the filesystem hierarchy level derived from the filesystem path.

15. A non-transitory computer readable medium for obtaining information related to a filesystem path in a file system that is stored in a storage system, the non-transitory computer readable medium stores instructions for:

receiving a request to obtain hierarchy information related to file system entities stored under the filesystem path, wherein the request is indicative of the filesystem path;

splitting the filesystem path into path components of the filesystem path, wherein each path component is associated with an ancestor directory of the file system entities stored under the filesystem path;

retrieving the hierarchy information; wherein the retrieving comprises accessing a filesystem hierarchy table that stores information regarding pathnames of file system entities of the file system; wherein the retrieving includes searching for the path components of the filesystem path in subsets of cells of the filesystem hierarchy table to provide rellevant subsets of cells, wherein each subset of cells is part of a set of cells that include path components of a certain pathname of a filesystem entity that belong to the file system, wherein each cell of each of the rellevant subsets of cells is indicative of a path component of the certain pathname, and wherein the cells of each of the rellevant subsets of cells are indicative of all the path components of the filesystem path; and responding to the request with information obtained from sets of cells that include the rellevant subsets of cells.

16. The non-transitory computer readable medium according to claim 15 that stores instructions for:

translating, by an alias data structure, the filesystem path to provide a translated filesystem path;

updating the query based on the translated filesystem path to provide an updated query; and applying the updated query on the filesystem hierarchy table.

17. A storage system having file system entity retrieval capabilities at a presence of snapshot restore in a history of the file system entity, the storage system comprises one or more processing circuitries that are configured to:

receiving a request to obtain hierarchy information related to file system entities stored under the filesystem path, wherein the request is indicative of the filesystem path;

splitting the filesystem path into path components of the filesystem path, wherein each path component is associated with an ancestor directory of the file system entities stored under the filesystem path;

retrieving the hierarchy information; wherein the retrieving comprises accessing a filesystem hierarchy table that stores information regarding pathnames of file system entities of the file system; wherein the retrieving includes searching for the path components of the filesystem path in subsets of cells of the filesystem hierarchy table to provide rellevant subsets of cells, wherein each subset of cells is part of a set of cells that include path components of a certain pathname of a filesystem entity that belong to the file system, wherein each cell of each of the rellevant subsets of cells is indicative of a path component of the certain pathname, and wherein the cells of each of the rellevant subsets of cells are indicative of all the path components of the filesystem path; and responding to the request with information obtained from sets of cells that include the rellevant subsets of cells.

* * * * *